(12) United States Patent
Pinchen et al.

(10) Patent No.: US 6,196,383 B1
(45) Date of Patent: *Mar. 6, 2001

(54) TEAR TAPE WITH HOLOGRAPHIC IMAGE

(75) Inventors: Stephen Paul Pinchen, Etwall; Carl Joseph Stonley, Giltbrook, both of (GB)

(73) Assignee: P. P. Payne Limited, Giltbrook (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/603,184

(22) Filed: Feb. 20, 1996

Related U.S. Application Data

(63) Continuation of application No. 08/109,357, filed on Aug. 20, 1993, now abandoned.

(30) Foreign Application Priority Data

Aug. 27, 1992 (GB) .................................................. 9218216

(51) Int. Cl.$^7$ ....................................................... C09J 7/02
(52) U.S. Cl. .......................... 206/264; 206/824; 428/915; 428/916; 428/354; 430/1; 430/2
(58) Field of Search ..................................... 428/915, 916, 428/354, 352, 343; 430/1, 2; 283/86, 101; 359/2; 206/264, 824

(56) References Cited

U.S. PATENT DOCUMENTS

| | | | | |
|---|---|---|---|---|
| 3,075,853 | * | 1/1963 | Striker et al. | 428/352 X |
| 4,629,647 | * | 12/1986 | Sander | 428/915 X |
| 4,631,222 | * | 12/1986 | Sander | 428/915 X |
| 4,908,285 | * | 3/1990 | Kushibiki et al. | 430/1 |
| 4,971,646 | * | 11/1990 | Schell et al. | 428/916 X |
| 4,980,222 | * | 12/1990 | Rivera et al. | 428/915 X |
| 5,145,212 | * | 9/1992 | Mallik . | |
| 5,200,253 | * | 4/1993 | Yamaguchi et al. | 428/915 X |
| 5,318,816 | * | 6/1994 | Yin et al. | 428/354 |
| 5,319,475 | * | 6/1994 | Kay et al. | 428/915 X |

FOREIGN PATENT DOCUMENTS

| | | |
|---|---|---|
| 170312 | 1/1988 | (EP) . |
| 0121371 | * 6/1988 | (EP) . |
| 2211760 | 12/1989 | (GB) . |

* cited by examiner

*Primary Examiner*—Daniel Zirker
(74) *Attorney, Agent, or Firm*—Seyfarth Shaw

(57) ABSTRACT

A substrate, such as the surface of goods or of packaging material for goods, is provided with a security device by applying, to the substrate, a pressure sensitive adhesive tape carrying a security device in the form of a hologram.

8 Claims, 1 Drawing Sheet

TEAR TAPE WITH HOLOGRAPHIC IMAGE

Figure 1:
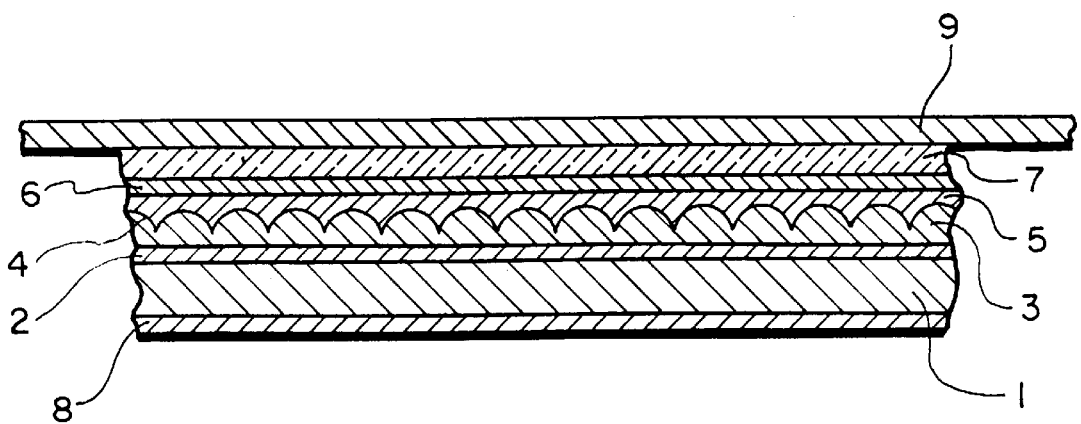

This is a continuation of application Ser. No. 08/109,357, filed Aug. 20, 1993 abandoned.

This invention relates to tapes and is concerned with tapes for applying security devices to goods and like articles.

The production and sale of counterfeit goods is an ever-increasing problem. Such counterfeit goods are frequently packaged so that they resemble the genuine goods as closely as possible with a view to misleading the purchaser into believing that genuine goods are being bought. This causes concern to the manufacturer of the genuine goods. Firstly, the counterfeit sales are sales which ordinarily the manufacturer of the genuine goods could reasonably expect to have made. More importantly, however, the counterfeit goods are often of inferior quality to the genuine goods and thus their sale can seriously damage the reputation of the manufacturer of the genuine goods since the purchaser of the inferior counterfeit goods will ordinarily assume that the goods are in fact genuine and will, in future, be less inclined to purchase the genuine goods. Further, in the case where the counterfeit goods are, for example, replacement brake shoes for a motor vehicle, they may not meet the quality control standards of the manufacturer of the original goods and may thus constitute a risk to the safety of the user.

It is therefore desirable to provide goods or the packaging for goods with a security device which will act as a guarantee that the goods are genuine goods. One known form of security device is a hologram. Conventionally, such holograms are applied by means of a hot foil stamping process. In this process, the holograms are formed on a carrier web provided with a heat activatable adhesive on its underside. Each hologram is applied to the goods or packaging by stamping it with a heated tool which cuts the hologram from the web, activates the adhesive, and presses the hologram against the surface of the goods or packaging. The process is relatively slow and therefore expensive.

It is known to provide cards or tickets with magnetic information representing monetary value such as, for example, phone cards for telephone services and tickets for transport services. The cards or tickets are normally prepaid and, when used to pay for the service associated therewith, they are read by an appropriate machine which determines whether or not the monetary value of the card is appropriate to the service required and, if it is, the service is provided. The magnetic information may be in the form of a magnetic strip carried by a support of, for example, card or plastics material. It is desirable to provide such cards or tickets and indeed other articles carrying magnetic information, such as credit cards, with a security device to prevent fraudulent use. However, as indicated above, there are difficulties in applying holographic security devices.

It is one object of the present invention to provide a simple technique whereby holograms may be applied to goods and other substrates.

According to one aspect of the present invention there is provided a tape for applying to a substrate, to attach a security device to the substrate, which tape is formed from an oriented base film of thermoplastic plastics material coated with a pressure sensitive adhesive composition on one surface and with a release agent on another surface and including a security device in the form of a hologram.

By providing the hologram on a tape in this way, the hologram can be readily applied to the substrate by moving the tape and substrate along converging paths and then affixing the tape to the substrate by means of the adhesive.

Figure 2:
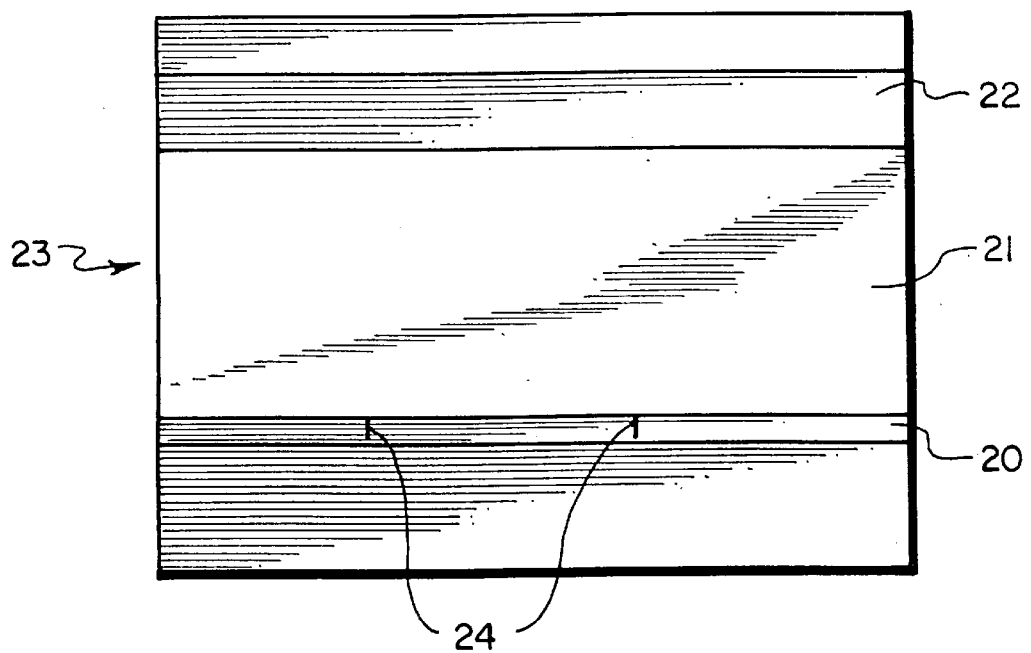

Accordingly, another aspect of the present invention provides a method of attaching a security device to a substrate which comprises:

(i) providing a continuous tape as above defined,
(ii) causing the substrate to move along a substrate path,
(iii) moving the tape along a tape path,
(iv) bringing the paths together, and
(v) affixing the tape to the substrate by means of the adhesive The present invention is described with reference to the accompanying drawings, in which:

FIG. 1 is a diagrammatic cross-sectional view through a tape applied to a substrate in accordance with the present invention; and FIG. 2 is a plan view of a ticket including a tape in accordance with the present invention.

In an embodiment, the substrate is packaging material of, for example, plastics material film or card or fibre board or corrugated board, for enveloping goods to form a package. In this case, the tape may function as a tear tape to facilitate the opening of the package. More particularly, it will generally have a free end which can be gripped by the opener and, when pulled, tears through the packaging material to enable access to be gained to the goods inside the package. In addition, however, the hologram incorporated in the tear tape serves as a security device and enables the recipient of the package to ascertain whether or not the packaging material and tear tape have been applied by an authorised person and hence whether or not the goods in the package are genuine goods. The recipient merely needs to ascertain whether or not the tear tape includes an authentic hologram as used by the original manufacturer or other authorised person. If the tear tape includes no hologram at all, then the recipient knows that the goods are not genuine goods. Similarly, if the tear tape includes a hologram which is not of the type used by the authorised person, then again he knows that the goods are not genuine.

In another embodiment, the substrate may be a shrink sleeve or a shrink collar provided on an article to prevent tampering with the article, with the tape acting as a security device to provide an indication of attempts to remove and replace the sleeve and also, optionally, acting as a tear tape for the sleeve or collar to facilitate opening. In the latter case, the tape is preferably disposed on the shrink sleeve relatively to perforations in the sleeve such that the tape splits as it tears the sleeve. In this way the tape is damaged and cannot be put to fraudulent re-use.

In a further embodiment, the substrate may be a label, for example, a shrink label, denoting authenticity, with the tape acting as a security device indicating that the label has not been removed and replaced. In these cases also, by examination of the hologram the recipient of a package incorporating a tape in accordance with the invention can readily ascertain whether or not the tape is of the type applied by the manufacturer of the genuine goods or some other authorised person.

The tape may also be directly applied to the goods themselves (instead of to the packaging material therefor) in the case where the goods are containers of, for example, expensive products such as brandy.

In a further embodiment, the substrate may be a sheet of plastics material or card carrying or intended to carry machine readable magnetic information representing, for example, a monetary value with the hologram of the tape providing the substrate with a security device to prevent fraud. In this case, in order to facilitate the stacking of a plurality of such sheets, it is preferred for each sheet to include two tapes at opposite ends of the sheet (on the same surface of the sheet or on opposite surfaces). In this way, a more stable stack of sheets is obtained.

The magnetic information may, for example, be a magnetic image formed in a layer of a magnetisable composition based upon ferric oxide or chromic oxide. Such compositions are, however, coloured and it may be preferred for the magnetisable composition to be colourless. Colourless magnetisable compositions are known and may comprise, for example, a transparent colourless plastic matrix containing a particulate crystalline magnetisable dispersed phase having a matching refractive index. The dispersed phase may comprise a colourless ferromagnetic atom such as a rare earth element (e.g. gadolinium), a refractory metal oxide such as titanium oxide, an inorganic fluoride such as calcium fluoride, and a glass such as an inorganic borate, phosphate, oxide or fluoride. The plastic matrix may be, for example, polyvinyl chloride or an acrylic polymer.

In the case where the tape is applied to filmic packaging material or other non-rigid packaging material such as fibre-board or card, it is preferred for it to be applied using a tape dispenser including a motorised reel for the tape in accordance with our EPB-0121371. In this way tension imbalance between the tape and the packaging material is reduced by controlling the speed of movement of the tape in dependence on the speed of movement of the packaging material by increasing the rotational speed of the reel when the tension in the tape increases and by decreasing the rotational speed of the reel when the tension in the tape decreases. Alternatively, in the case where the substrate is corrugated board or other relatively non-extensible material, the tape may be applied using non-motorised tape dispensers.

In the case where the substrate is fluted board, the tape may be threaded and secured between the fluting and the inner or outer liner so that it is not readily visible so as to provide the substrate with a covert security device.

Preferably the tape is produced in the form of traverse wound reels containing from, for example, 3000 to 60000 linear metres.

The base film of the tape, which may be in the form of a laminate, may for example have a thickness of from 10 to 100 $\mu$m and a width of from 1 to 20 mm. Preferably, the thickness is from 20 to 70 $\mu$m and the width is from 1.5 to about 15 mm.

The plastics material of the base film is oriented so as to reduce its extensibility and to enable thinner tape to be produced and it may be oriented either monoaxially or biaxially. Any thermoplastic plastics material may be used for the base film provided that it is sufficiently dimensionally stable in the cross-direction to facilitate accurate slitting of sheets of the material to form the tape. Also, the plastics material needs to be metallisable unless it is coated with a primer receptive to metallisation. It is particularly preferred for the thermoplastic plastics material to be formed from monoaxially oriented polypropylene or from biaxially oriented polyester or polyester laminate. The hologram may be applied to one surface of the base film or it may be sandwiched between two base films.

Any suitable pressure sensitive adhesive composition may be used. Thus, it may, for example, be based on natural or synthetic rubber or on acrylic compounds and normally a primer coating will be provided between it and the surface of the base film so as to promote anchorage of the pressure sensitive adhesive composition. That surface of the base film which is not coated with the pressure sensitive composition is coated with a release agent such as a silicone release lacquer.

A wide variety of holographic images can be incorporated to provide the desired security device. For example, they may be in the form of spirals in one or other direction or a combination of the two. Moreover, they may exhibit a sequence of colours. The holograms which are in the form of two dimensional images, three dimensional images, or a combination of both. Further, the hologram may have different levels of security built into it. Thus, it may comprise an overt security device having an image visible to the naked eye and/or a covert security device having an image which is quasi visible or invisible to the naked eye. (Quasi visible images are images which include deliberate errors which are not readily apparent on inspection with the naked eye and which are included in order to assist in the detection of copying). More particularly the hologram may incorporate invisible images which can only be constructed by viewing the hologram at particular angles or under special light conditions using specialist scanning equipment. In the case where the hologram includes a visible image, it may represent, for example, a monetary value or a trade mark in addition to serving as a security device.

Ordinarily, the holograms may be manufactured using embossing techniques to produce a plurality of longitudinally extending holographic images across the surface of a web of the base film material and this web is then slit to form a plurality of tapes with each tape including one of the longitudinally extending holographic images. Before slitting the web, it is ordinarily coated with both a primer and the pressure sensitive adhesive composition on one surface and with the release agent on the other. In the case where the tape is to be used as a tear tape for transparent filmic packaging material, the pressure sensitive adhesive composition will be transparent and coated on to that surface of the web which carries the holographic image in right-reading form so that the image can be seen through the composition and the filmic packaging material. In the case where the tape is to be applied to a label, or other non-transparent substrate, the base film.of the tape will generally be provided with the hologram in wrong-reading form prior to overcoating with the pressure sensitive adhesive.

Preferably the holograms are tamper-proof or tamper-evident. Thus, for example, that part of the tape carrying the hologram may be provided with score lines or perforations so that the tape will rupture and not pull off in one piece from the substrate if attempts are made to transfer the tape to another substrate.

The tapes of the invention are useful for applying holographic security devices to packages of cigarettes, perfumes, spirits and other high value duty free goods; to packages of car parts, computer software, and pharmaceuticals; to FMCG (fast moving consumer goods); and to tickets and cards.

The Following Example Illustrates the Invention

EXAMPLE 1

Referring to FIG. 1, a film 1 of monoaxially oriented polypropylene having a thickness of about 40 $\mu$m was formed in conventional manner. One surface of the film was then primed with a primer 2, coated with embossing lacquer 3 and embossed to form a plurality of longitudinally extending right-reading holographic images 4 in the surface in the conventional manner. The imaged surface was then coated with aluminium 5. It was subsequently coated with a primer 6 and a transparent pressure sensitive adhesive composition 7. The primer was a solution in toluene of 25 parts of natural crepe rubber and 8 parts of a cross-linking agent (Vulcabond TX) to give a coating weight of 0.25 gms per square metre. Vulcabond TX is manufactured by ICI and is a 50% solution of polyisocyanate (mainly diphenyl methane di-isocyanate)

in xylene. The pressure sensitive adhesive composition was a solution of 100 parts natural crepe rubber, 110 parts of a tackifying resin having a melting point of 110/115° C. (Arkon P) and one part of an oxidant (Irganox) dissolved in a hydrocarbon mixture (SBP2). This was applied by a conventional reverse role coating technique to give a dry coating weight of 15 to 20 g/m². Arkon P is marketed by Arakara Chemicals and is a fully saturated cyclic hydrocarbon resin and Irganox is marketed by Ciba-Geigy and is a high molecular weight bonded polyphenol.

The non-imaged surface of the web was then coated with a release agent 8 comprising 100 parts of Silcolease 425 (a 30% solids concentration of dimethyl polysiloxane and methyl hydrogen polysiloxane resins in toluene from Rhone Poulenc) together with 4 parts of Catalyst 62A and 4 parts Catalyst 62B (50% solids concentration of aminoalkoxy-polysiloxane in toluene and alkyl tin acrylate in xylene, respectively from Rhone Poulenc). It was applied to give a dry coating weight of 0.25 g/m².

The thus coated film was then slit longitudinally in registry with the longitudinally extending holographic images so as to provide a plurality of pressure sensitive tear tapes of width 3 mm and each including a holographic image extending continuously longitudinally of the tape. The resultant tape was then traverse wound onto centres of internal diameter 150 mm and widths 170 mm to provide reels carrying continuous lengths of tape about 50,000 metres long.

The tear tape was subsequently fed from the-reel along a path converging with the path of moving polypropylene packaging film 9, so as to be adhered thereto by the adhesive, in a film overwrapping machine to produce a plurality of packages each including a tape which is for tearing the overwrapping film by the end user and which carries a security device in the form of a hologram. The holographic image on the tear tape served as an indication of the authenticity of the goods in the packages.

EXAMPLE 2

Referring to FIG. 2, a biaxially oriented polyester film was prepared and provided with wrong-reading holographic images in the manner of Example 1. The holographic images included overt images and covert images which were machine readable. The imaged surface was coated with a primer and pressure sensitive adhesive composition and the other surface of the film was coated with a release agent. Thus the images were right-reading when viewed through the release agent coating.

The pressure sensitive adhesive composition was a 45% solids solution of a self cross-linking acrylic polymer in a mixture of 37 parts ethyl acetate, 26 parts heptane, 26 parts isopropanol, 1 part toluene and 1 part acetylacetone. This is commercially available as 180-1054 from National Starch Corporation. The primer was a mixture of 100 parts of the aforesaid 180-1054, 1400 parts of toluene, and 10 parts of the aforesaid Vulcabond TX. The release agent comprised 20 parts of Syloff 7046, 79.9 parts of toluene and 0.1 part of a reactive siloxane polymer known as catalyst/cross linking agent 7048 (Dow Corning). Syloff 7046 is a mixture of reactive siloxane polymers available from Dow Corning.

The coated film was slit to form a tape 20 of 2 mm width and the tape was traverse wound onto centres of internal diameter 29 mm and widths of 85 mm to provide reels of continuous tape of about 7000 metres long.

A web of card 21 was coated with a magnetisable composition to form a magnetic strip 22 extending along the web. The tape was fed, from the reel, along a path converging with a path along which the web of card was moving so as to be affixed to the web by the adhesive. The web was then cut into a plurality of separate tickets 23, each of which included a magnetic strip and, at opposite ends of the ticket, a length of the tape provided with a hologram. During this cutting operation, a plurality of score lines 24 was simultaneously provided transversely across the tape in the region of the hologram. The magnetic strip of each ticket was then encoded so as to represent a monetary value.

The tickets could be used to obtain services appropriate to the monetary value represented by the magnetic strip as determined by means of a suitable reader machine. The hologram served as a security device to prevent fraudulent use of the tickets.

What is claimed is:

1. A self-wound, tear tape for applying to a substrate to attach a holographic image to the substrate, which tape comprises;

an oriented base film of thermoplastic plastic material and having first and second surfaces, a release agent coated on the surface of the base film, a holographic image on the second surface of the base film inseparable therefrom, and a pressure sensitive adhesive composition coated over the holographic image.

2. A tape as claimed in claim 1, wherein the thermoplastic plastic material is selected from the group consisting of monoaxially oriented polypropylene and biaxially oriented polyester.

3. In combination: (i) a self-wound, tear tape which comprises an oriented base film of thermoplastic plastic material and having first and second surfaces, a release agent coated on the first surface of the base film, a holographic image on the second surface of the base film inseparable therefrom, and a pressure sensitive adhesive composition coated over the holographic image; and (ii) a substrate to which the tape is adhered by said adhesive.

4. A combination as claimed in claim 3, wherein the substrate is selected from the group consisting of packaging film and cardboard.

5. A combination as claimed in claim 3, wherein the holographic image is provided with score lines.

6. A combination as claimed in claim 3, wherein the substrate additionally includes a layer of a magnetizable composition.

7. A combination as claimed in claim 3, wherein the holographic image is provided with perforations.

8. A combination as claimed in claim 3, whereby the substrate is selected from the group consisting of a shrink sleeve, a shrink collar and a label.

* * * * *

UNITED STATES PATENT AND TRADEMARK OFFICE
CERTIFICATE OF CORRECTION

PATENT NO. : 6,196,383 B1
DATED : March 6, 2001
INVENTOR(S) : Pinchen et al.

It is certified that error appears in the above-identified patent and that said Letters Patent is hereby corrected as shown below:

Column 6,
Line 28, before "surface" insert -- first --.

Signed and Sealed this

Second Day of October, 2001

Attest:

NICHOLAS P. GODICI
Attesting Officer
Acting Director of the United States Patent and Trademark Office